June 5, 1962     C. S. WHITE     3,037,893
BEARING ELEMENT COMPRISING FIBROUS FLUOROCARBON
Original Filed May 9, 1956
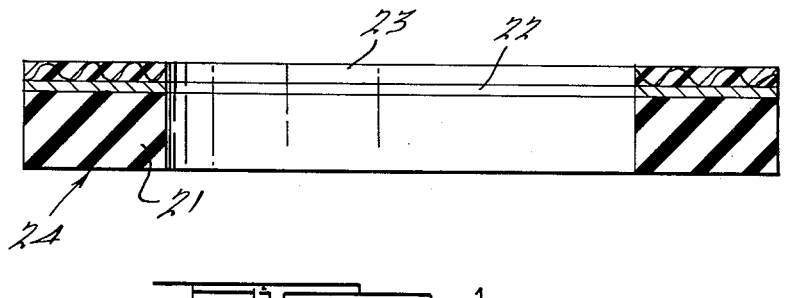
FIG. 1.
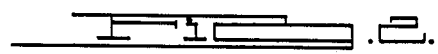
FIG. 2.
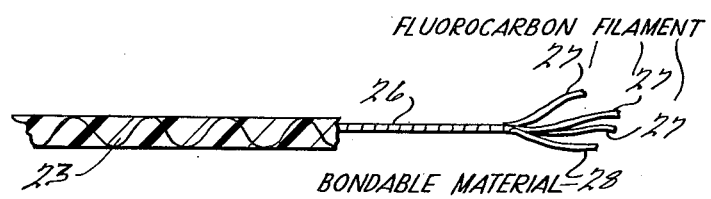
INVENTOR.
Charles S. White
BY
Harness, Dickey & Pierce
ATTORNEYS United States Patent Office 3,037,893
Patented June 5, 1962

3,037,893
BEARING ELEMENT COMPRISING
FIBROUS FLUOROCARBON
Charles S. White, Rte. 3, Box 454-h, Palmdale, Calif.
Original application May 9, 1956, Ser. No. 583,656, now Patent No. 2,907,612, dated Oct. 6, 1959. Divided and this application Aug. 3, 1959, Ser. No. 831,393
5 Claims. (Cl. 154—43)

This invention pertains to low friction bearing material, and particularly to a low friction bearing material made from clothlike fabric woven with threads containing low friction and bondable fibers, and is a division of application Serial No. 583,656, filed on May 9, 1956, now United States Patent No. 2,907,612 issued October 6, 1959.

In the United States patents to C. S. White No. 2,804,-886 issued September 3, 1957, and No. 2,906,552 issued September 29, 1959, and in C. S. White United States application Serial No. 483,657 filed May 9, 1956, for A Metal Bearing Having a Low Friction Resin Surface, now abandoned, bearing seals and the like are illustrated having a dry surface of low friction resin material. When the low friction fluorocarbon resins, such as Teflon, are drawn into threads and woven or otherwise formed into a clothlike layer, additional bonding material is employed therewith to retain the Teflon filaments in fixed position.

It is an object of the present invention to provide a clothlike material made from threads containing filaments of Teflon and fibers or filaments of a bondable material. When the clothlike material is porous, a layer of latex or other bondable material may be bonded to the bondable material to form a barrier layer. Any well-known bondable resin or other material may be employed as a barrier material if it is capable of preventing the passage of the material of the backing element and has affinity to bond therewith.

Accordingly, the main objects of the invention are: to form a clothlike material from threads at least some of which have filaments of Teflon therein along with other filaments or fibers; to weave a cloth from threads containing low friction filaments and fibers or filaments of a bondable material, and, in general, to form a low friction surface from threads containing bondable and nonbondable filaments and/or fibers.

Other objects and features of novelty of the invention will be specifically pointed out or will become apparent when referring, for a better understanding of the invention, to the following description taken in conjunction with the accompanying drawing, wherein:

FIGURE 1 is a sectional view of a washer cut from a sheet having a base material bonded to a material containing threads at least some of which have low friction and bondable fibers and/or filaments, and FIG. 2 is an exploded view of a low friction layer showing a thread thereof containing the bondable and non-bondable fibers and/or filaments.

In the above mentioned Patent No. 2,906,552, seals are illustrated having a low friction resin material applied to the shaft engaging faces thereof. The low friction material employed therein was of the woven type having fine interstices between the Teflon threads of the cloth material. The present invention pertains to the use of threads containing the low friction nonbondable and the bondable fibers and/or filaments.

In FIGS. 1 and 2, resilient backing members are illustrated with the low friction material secured thereto in a manner to prevent the passage of the material of the backing member through to the engaging face of the low friction material. In FIG. 1 a washer 24 is illustrated by way of example having a backing layer 21 of rubber, or other resilient material well known in the art. A barrier and bondable layer 22 secures a low friction layer 23 to the backing layer 21 in a manner to provide an impervious surface which prevents the material of the backing layer from passing therethrough.

The bonding layer 22 secures the surface layer 23 to the backing member 21. The fibers and/or filaments of the low friction surface layer 23 is made from fluorocarbon resin, preferably polytetrafluoroethylene commonly sold under the well-known name Teflon. The fibers and/or filaments are made into threads along with fibers and/or filaments of a bondable material. The threads are woven or otherwise interrelated into a cloth-like layer containing low friction and bondable filaments or fibers by which it is secured to the backing layer 21 by the bondable layer 22. While in Patent No. 2,804,886 above mentioned the woven fiber material has bondable cords on one face thereof, in FIG. 2 the layer of low friction material is illustrated as being made of threads 26 which are obtained from fibers 27 of the low friction fluorocarbon resin material, such as Teflon, along with fibers 28 of bondable material, such as cotton, nylon, vinyl and like resins, wool, glass and the like. Each of the threads 26 will have a varying proportion of the low friction material therein and have exposed fibers of a material which will readily bond to other resins. The layer 23, when woven from the threads 26, will have a face containing low friction resin material as well as fibers or filaments to which an adhesive material 22 will bond so that the resulting layer 23 may be directly bonded to backing materials of any substance to which the adhesive material will bond.

The thread of the present invention is unique in that it provides a layer 23 which has low friction filaments which are retained in position by the bondable filaments or fibers which are provided therewith. The layer 23 is of clothlike form made from threads which are woven, compacted, matted or otherwise secured together.

What is claimed is:

1. A bearing element comprising a backing member, and a fabric made from threads having polytetrafluoroethylene fibers and fibers which readily bond to said backing member, said latter bondable fibers being bonded to said backing member to mechanically secure said polytetrafluoroethylene fibers in position to form the low friction surface of said element.

2. A bearing element comprising a backing member, and a fabric made from threads having low friction fibers and fibers which readily bond to said backing member, said latter bondable fibers being bonded to said backing member to mechanically secure said low friction fibers in position to form the low friction surface of said element.

3. A cloth woven from therads, at least some of said threads having fibers of low friction fluorocarbon resin and fibers which readily bond to a material which will not bond to the fluorocarbon resin for bonding the cloth to an element to which the material will bond.

4. The invention as defined in claim 3 wherein said low friction fibers are polytetrafluoroethylene fibers.

5. A cloth woven from threads, at least some of said threads having fibers of low friction fluorocarbon resin and fibers which readily bond to a material which will not bond to the fluorocarbon resin for bonding the cloth to an element to which the material will bond, the threads being made up of a preponderance of fibers of low friction fluorocarbon material.

References Cited in the file of this patent
UNITED STATES PATENTS

| 2,681,223 | Walters et al. | June 15, 1954 |
| 2,777,783 | Welch | Jan. 15, 1957 |
| 2,804,886 | White | Sept. 3, 1957 |
| 2,906,552 | White | Sept. 29, 1959 |
| 2,907,612 | White | Oct. 6, 1959 |
| 2,919,219 | Smith | Dec. 29, 1959 |